United States Patent
Lynch (10) Patent No.: US 11,296,487 B2
(45) Date of Patent: Apr. 5, 2022

(54) DIELECTRIC COVER FOR HIGH VOLTAGE COMPONENT WITH HOOD OVER HOLE FOR RETAINING PIN

(71) Applicant: Eco Electrical Systems, Reno, NV (US)

(72) Inventor: Michael Lynch, Reno, NV (US)

(73) Assignee: Eco Electrical Systems, Reno, NV (US)

( * ) Notice: Subject to any disclaimer, the term of this patent is extended or adjusted under 35 U.S.C. 154(b) by 453 days.

(21) Appl. No.: 16/442,231

(22) Filed: Jun. 14, 2019

(65) Prior Publication Data

US 2020/0395745 A1   Dec. 17, 2020

(51) Int. Cl.
*H02B 1/06*   (2006.01)
*H02G 3/08*   (2006.01)
*H01H 31/00*  (2006.01)

(52) U.S. Cl.
CPC .......... *H02G 3/081* (2013.01); *H01H 31/006* (2013.01)

(58) Field of Classification Search
CPC ...... H01B 19/00; H01B 17/00; H01B 17/005; H01B 17/56; H01B 17/26; H01B 7/00; H01B 17/583; H02G 7/00; H02G 1/02; H02G 3/081; H05K 5/03; H01R 4/70; A01M 29/00; A01M 29/32; H01H 31/006; H01H 31/122; H01H 31/127
USPC ......... 174/152 G, 153 G, 135, 152 R, 138 R, 174/139, 138 F, 137 R, 5 R, 140 H, 5 SB; 337/168, 202, 403, 171; 361/232
See application file for complete search history.

(56) References Cited

U.S. PATENT DOCUMENTS

| | | | | | |
|---|---|---|---|---|---|
| 4,845,307 A | * | 7/1989 | Cumming | ............. | H01B 17/26 174/5 R |
| 6,291,774 B1 | * | 9/2001 | Williams | ............... | H01B 17/00 174/135 |
| 7,154,036 B2 | * | 12/2006 | Lynch | ..................... | H02G 7/00 174/5 R |
| 7,309,837 B1 | * | 12/2007 | Rauckman | ............ | H01B 17/00 174/135 |
| 7,839,256 B2 | * | 11/2010 | Bradford | ............... | H01H 85/25 174/138 F |
| 8,772,633 B2 | * | 7/2014 | Behnken | ............... | H01B 19/00 174/5 R |
| 8,957,314 B2 | * | 2/2015 | Niles | ....................... | H02G 7/00 174/140 H |
| 9,413,153 B2 | * | 8/2016 | Spencer | ................ | H01B 17/00 |

(Continued)

*Primary Examiner* — Angel R Estrada
(74) *Attorney, Agent, or Firm* — Patent Law Group; Brian D Ogonowsky (57) ABSTRACT

For protecting wildlife from electrocution by high voltage components, dielectric covers are used to cover fuse cutouts, insulators, or other high voltage components. The cover includes through-holes for receiving retaining pins to secure the cover in place. The holes are the weak link in flashover prevention since the holes form an air gap, which has a breakdown voltage lower than that of the cover material. To prevent a bird's wing or a squirrel's tail from directly covering the hole in the surface of the cover, an arched or tubular hood is formed around each hole to block the bird or squirrel from directly covering the hole, reducing the risk of a flashover through the hole. The hoods extend out about 1-1.5 inches to essentially add a 1-1.5 inch air gap between the animal and the hole without enlarging the cover.

13 Claims, 7 Drawing Sheets

(56) References Cited

U.S. PATENT DOCUMENTS

| | | | |
|---|---|---|---|
| 9,960,586 B2 * | 5/2018 | Niles | H02G 7/00 |
| 10,881,097 B2 * | 1/2021 | Lynch | A01M 29/32 |
| 10,958,046 B2 * | 3/2021 | Lynch | H01B 17/38 |

* cited by examiner

DIELECTRIC COVER FOR HIGH VOLTAGE COMPONENT WITH HOOD OVER HOLE FOR RETAINING PIN

FIELD OF THE INVENTION

The invention relates to dielectric covers for high voltage components in an electric power distribution system, such as a cover for a fuse cutout or an insulator, to protect wildlife.

BACKGROUND

Providing a dielectric cover over a high voltage component in an electrical distribution system is common to protect large birds and other animals from electrocution, which may also trigger an over-current condition due to an electrical short between phases or phase to ground that may cause a power outage. Typically, the cover is used where the high voltage component is proximate to a structure, such as a utility pole, where a large bird may roost.

Figure 1:
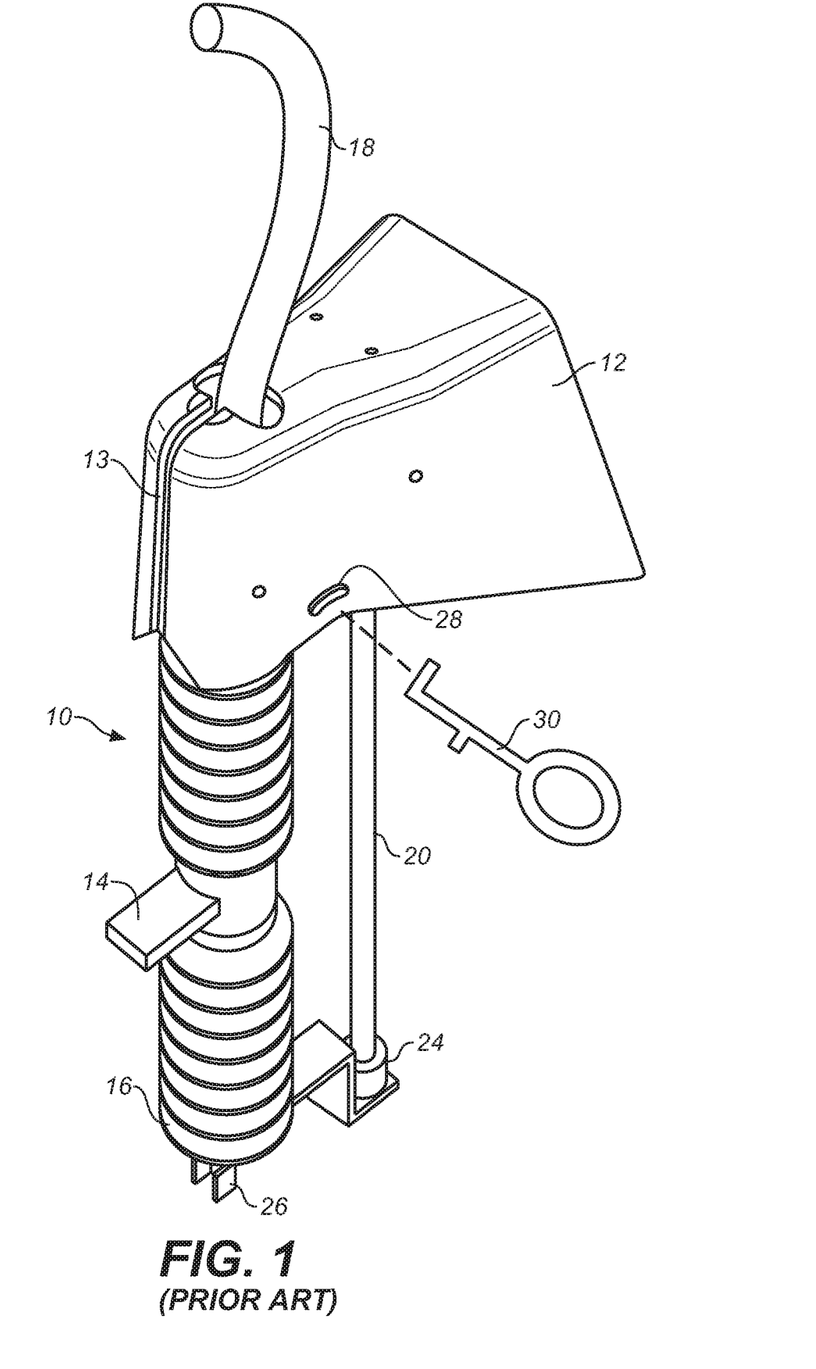
FIG. 1 illustrates a prior art cutout cover.

FIG. 1 is generally reproduced from the inventor's U.S. Pat. No. 7,154,034, incorporated herein by reference, and is used to illustrate a reported problem with wildlife electrocution. FIG. 1 illustrates a conventional fuse cutout 10 with a dielectric cover 12 over it to prevent wildlife, such as birds and squirrels, from causing a flashover between the high voltage components and ground, such as the grounded utility pole, or between two high voltage phases. The cover 12 can be installed even when the wire 18 is energized since it has a vertical slot 13 that allows the wire 18 to pass through. A mounting bracket 14 secures a ceramic or polymer insulator 16 to a wooden utility pole or crossarm used to support high voltage conductors, such as carrying 3-phase 12 KVAC or higher. A "hot" wire 18 is attached to one phase. The wire 18 is substantially vertical and typically tapped off an overhead wire running between utility poles. A metal connector (obscured by the cover 12) electrically connects the wire 18 to a top contact of a blowable fuse 20. The fuse 20 electrically connects to a pivot joint 24 and a bottom connector 26. The bottom connector 26 is connected to another wire (not shown) which may lead to a transformer or any other electrical device or conductor. Opening or blowing of the fuse 20 disconnects the wire 18 from the bottom connector 26.

The cutout 10 has a metal pull ring (obscured by the cover 12) that is electrically connected to the upper end of the fuse 20. By pulling on the ring with a load break tool, the fuse 20 may be pulled away to safely open the circuit.

The cover 12, and other similar covers, includes a hole 28 through which a plastic pin 30 is inserted. The hole 28 can be any suitable size for any size pin. The pin 30 goes under the top metal connector of the cutout 10 and through both sides of the cover 12 to keep the cover 12 from blowing off. Therefore, the pin 30 may come in direct contact with energized metal.

It has been reported to the inventor by a utility company that a large raptor had been found electrocuted by a high voltage flashover even though a cover, similar to the one shown in FIG. 1, was used over the cutout. The inventor was then asked to determine the likely cause of the flashover and to fix the non-obvious problem.

After thorough analysis and testing, the inventor determined that a possible cause of the flashover was due to a wing of the raptor directly contacting the edge of the hole 28, where the flashover occurred through the hole's air gap. This was likely exacerbated by the plastic pin 30 (contacting the energized metal) becoming wet and having a slightly conductive surface. The hole 28 is the weak link in the dielectric protection, since the breakdown voltage of air is less than that of the cover's dielectric material. The flashover path therefore likely included an air path through the hole 28.

IEEE standards dictate a minimum gap between high voltage components and ground to avoid flashover. The cover 12 is shaped to meet such minimum gap requirements, yet the flashover still occurred. Although the inventor could simply make the cover 12 larger to create a bigger gap between the high voltage components and the outer surface of the cover 12, this would add much more bulk to the cover 12 and require new packaging.

What is needed is a modification to the cover 12 and other similar covers that have holes for retaining pins, where the modification reduces the likelihood that an animal will be electrocuted when a portion of the animal nears the hole area, which is the weak link in flashover protection.

SUMMARY

The present invention improves dielectric covers for high voltage cutouts, insulators, bushings, wires, or other high voltage components, where the covers have holes for receiving a retaining pin that prevents the cover from being blown off in high winds.

Rather than enlarge the cover to further separate the hole (which is the weak link in flashover protection) from the closest covered energized component, an arched hood (or shroud) extends from the outer surface of the cover to surround the hole to prevent an animal, such as a raptor or squirrel, from directly contacting the hole area. The hood does not interfere with the pin being inserted into the hole.

In one embodiment, the hood comprises an integral, molded portion that extends from the outer surface of the cover by about 1-1.5 inches and surrounds the top and sides of the holes. The amount of plastic forming the hood is trivial and does not substantially add to the overall size and weight of the cover. The hood prevents direct contact of a bird's wing or squirrel's tail from directly contacting the hole area where the pin protrudes from the cover.

This effectively increases the air gap between the covered energized component and a bird's wing over the hole by 1-1.5 inches, reducing the likelihood of a flashover through the hole.

BRIEF DESCRIPTION OF THE DRAWINGS

Elements in the various figures that are the same or equivalent are labeled with the same numeral.

DETAILED DESCRIPTION

Figure 2:
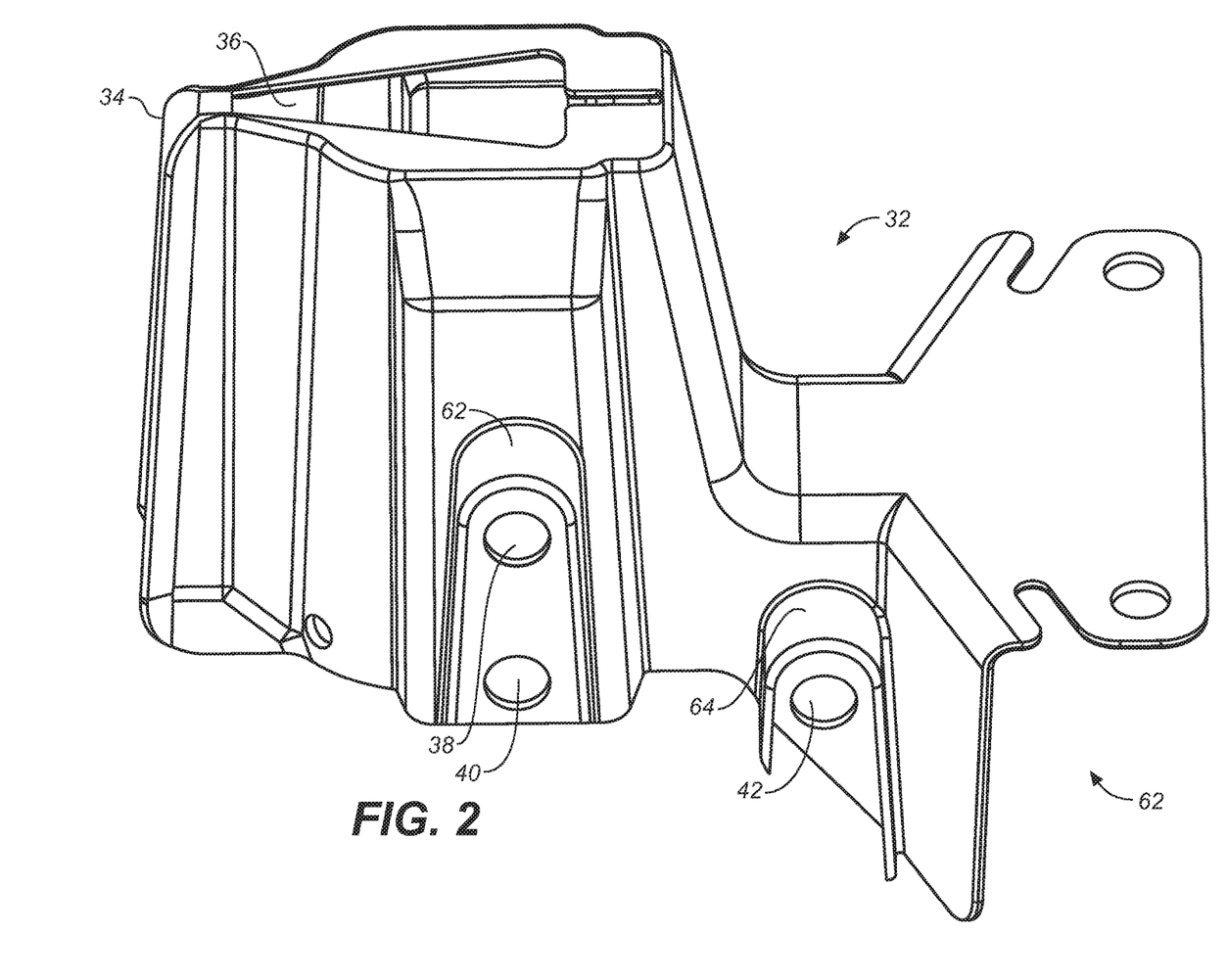
FIG. 2 is a perspective view of a cutout cover in accordance with one embodiment of the invention, where an arched hood extends over the holes for the retaining pins.
Figure 3:
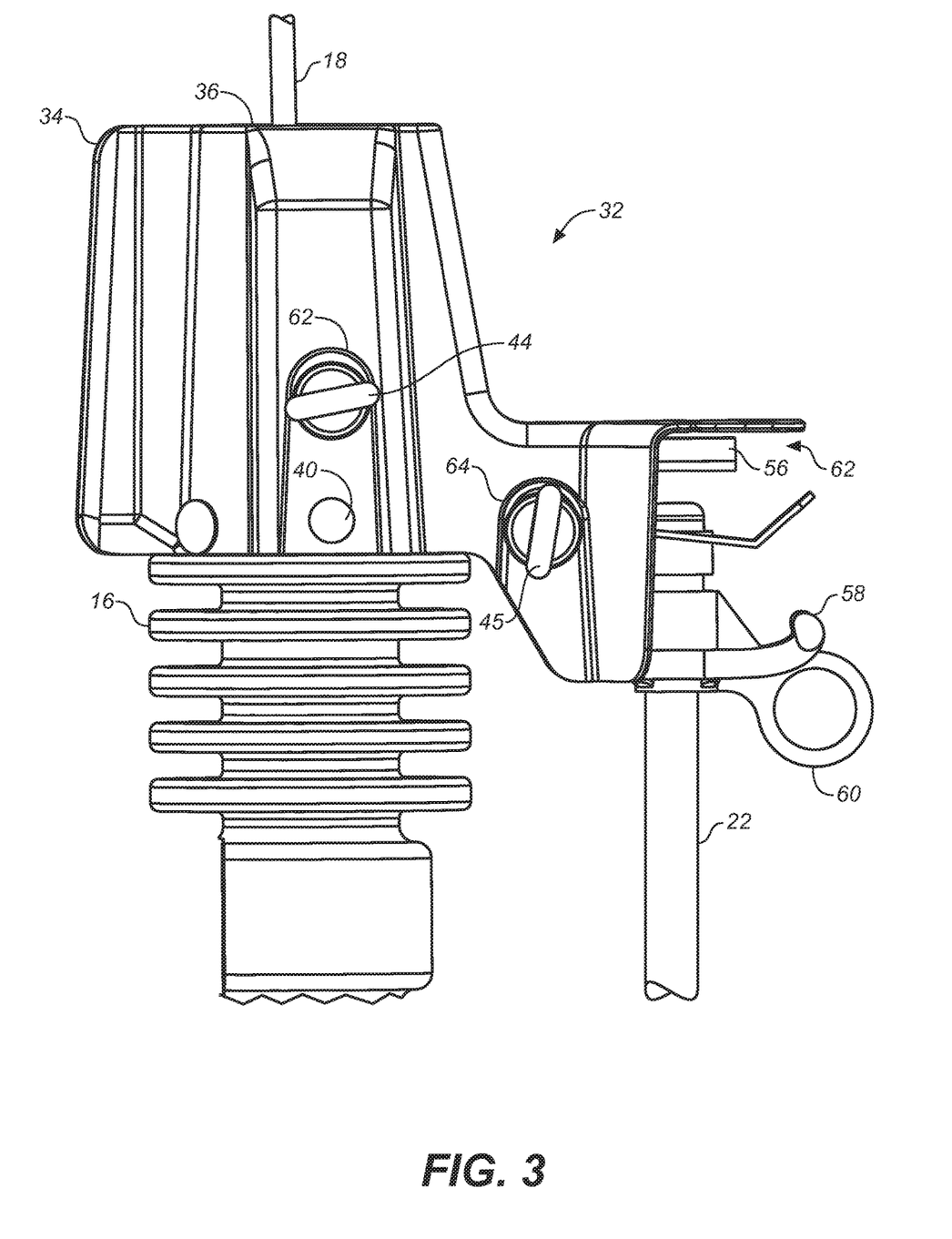
FIG. 3 illustrates the cover of FIG. 2 installed over a cutout.

FIG. 2 is a perspective view of one embodiment of a cutout cover 32 in accordance with one embodiment of the invention. FIG. 3 illustrates the cover 32 installed over the cutout 10 of FIG. 1, and FIG. 4 is a transparent top down view of the installed cover 32.

The cover 32 is formed of an injection-molded dielectric polymer. The cover 32 has a rear vertical slot 34 so that the cover 32 may be installed over the cutout 10 while the wire 18 (FIG. 3) is connected and energized. A hole 36 in the top of the cover 32 allows the wire 18 to extend through.

Figure 5:
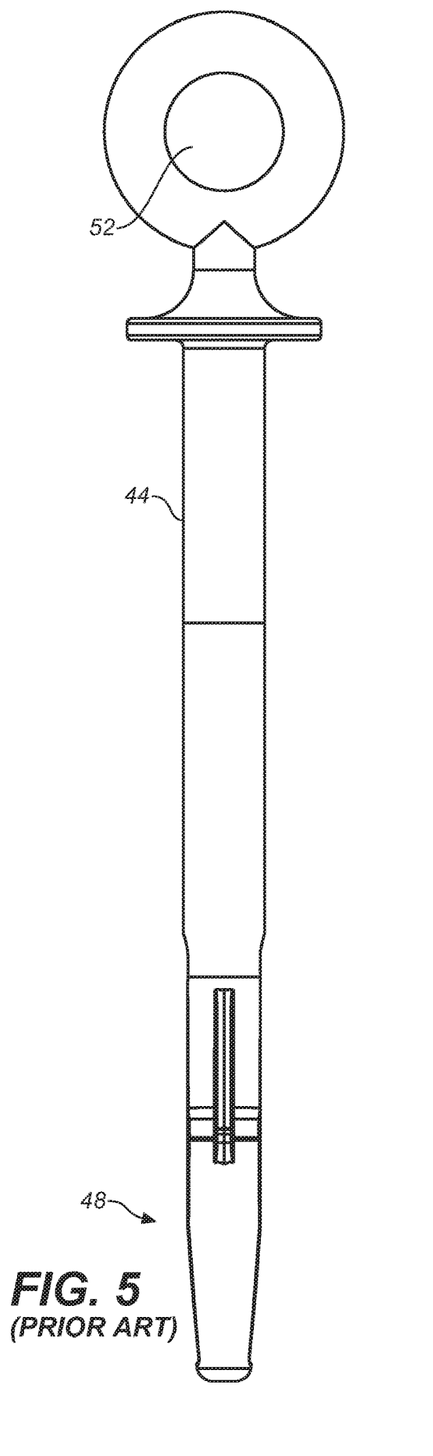
FIGS. 5 and 6 illustrate a side view and front view of a suitable retaining pin.
Figure 6:
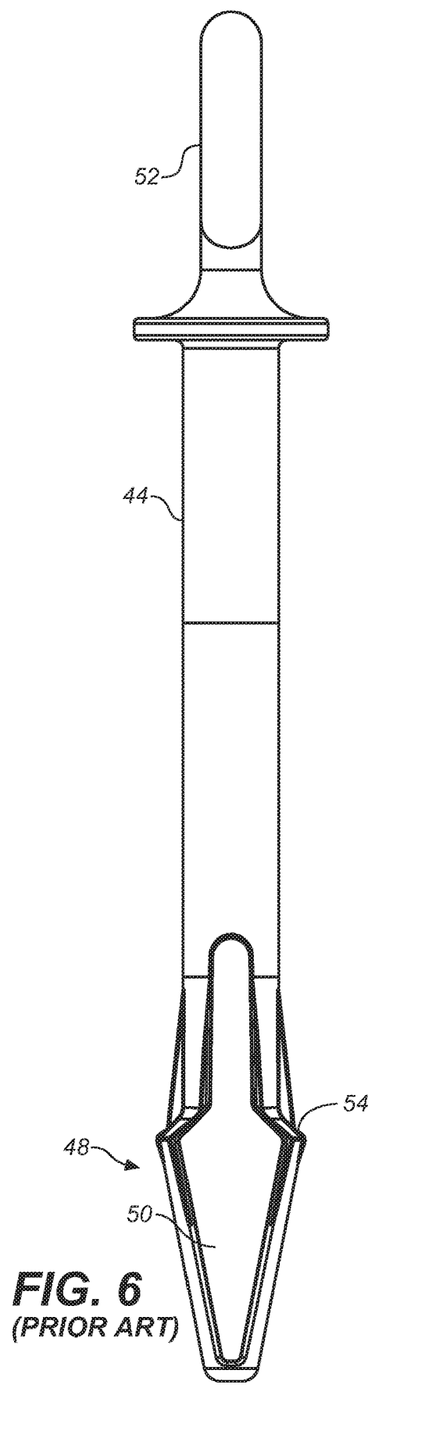

The holes 38, 40, and 42 are used for securing the cover 32 over the cutout 10 using retaining pins 44 and 45 (FIGS. 3, 5, and 6). The pins 44/45 pass through the holes 38, 40, and 42, then underneath the energized top connector metal of the cutout, then through corresponding holes on the other side of the cover 32. Only one of the holes 38 or 40 is used, depending on whether the insulator 16 is ceramic/porcelain or a polymer (thinner than ceramic). The other hole 42 is always used.

Figure 4:
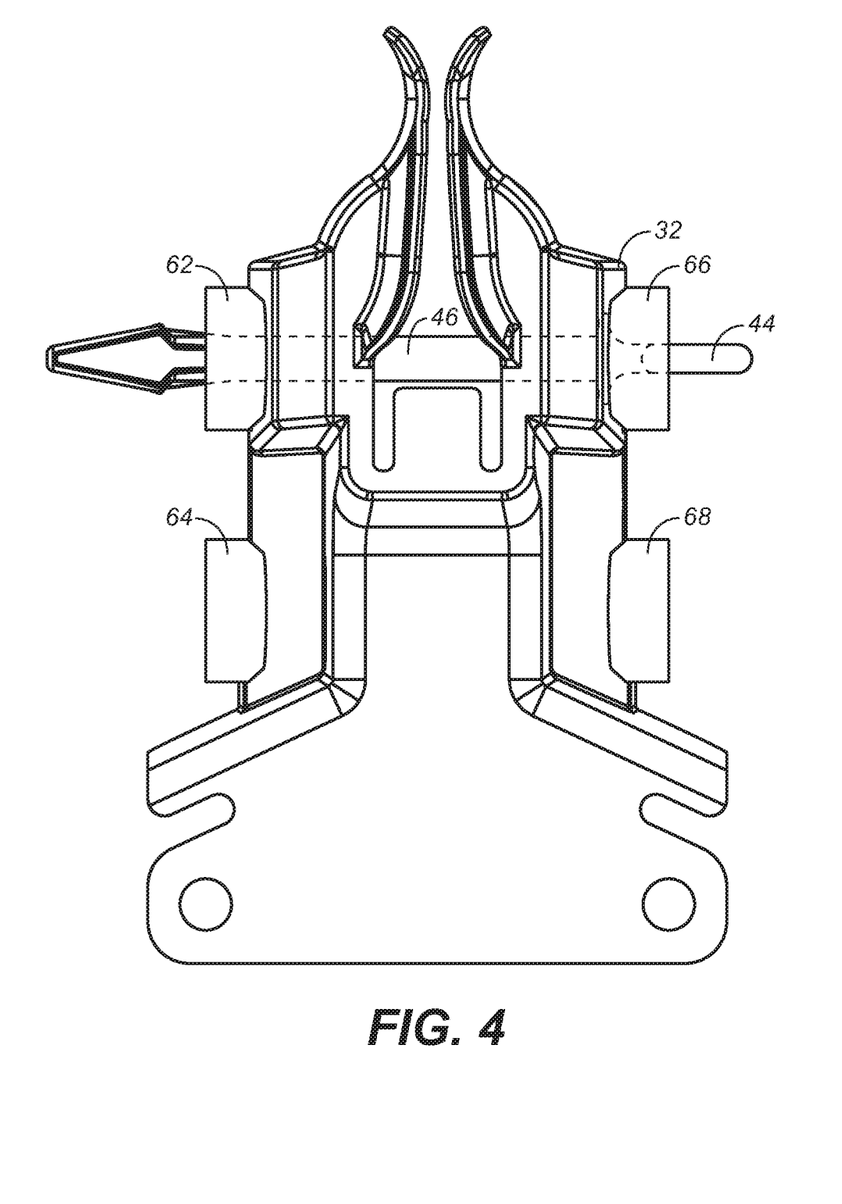
FIG. 4 is a top down transparent view of the installed cover with the retaining pin.

FIG. 4 is a transparent top down view of the installed cover 32, showing a pin 44 extending through holes in the cover 32 and below a horizontal metal connector 46 of the cutout.

FIGS. 5 and 6 show a retaining pin 44 that is pushed through two sets of the horizontally-aligned holes 38/40/42 after the cover 32 is positioned over the cutout 10. The pin 44 has a resilient end 48 with a slight taper 50 that makes it easy to push the pin 44 through the holes 38/40/42 using a hotstick grasping the pin 44 by the ring 52. A steeper taper 54 at the end 48 makes it more difficult to pull the pin 44 out. Depending on the type of insulator 16 used (e.g., ceramic or a narrower polymer), one of the holes 38 and 40 is best. Another pin 45 (FIG. 3) goes through the hole 42, under the metal top connector 56 (connected to the high voltage), to further secure the cover 32 in place.

A wide opening 62 in the front of the cover 32 allows a lineman to easily access the hook assembly 58 and pull ring 60 with a conventional load break tool to open the fuse 22. The metal hook assembly 58 is permanently connected to the metal top connector 56, while the pull ring 60 is connected to the top of the fuse 22. The load break tool creates a temporary connection between the hook assembly 28 and the pull ring 60 when pulling the fuse 22 away from the top connector 56 and extinguishes the arc using a spring-loaded switch in the load break tool.

The lineman may grasp the cover 32 using a hotstick via any of the holes 38/40/42 to install the cover 32.

The inventor solved a problem with an existing type of cutout cover having holes for the retaining pins. A large raptor was found electrocuted below a cutout having the prior art cover. The inventor determined that there was a flashover through one of the holes for the retaining pins, which likely occurred when the raptor's wing brushed over one of the holes. The holes are the weak link since the polymer cover material has a breakdown voltage that is higher than air. Further, due to moisture and airborne contaminants on the retaining pin, which may directly contact an energized metal component, the likelihood of a flashover through the holes is further increased. Rather than making the cover significantly larger to increase the distance between the outer surface of the cover and the energized components, the inventor improved the cover in the following way.

FIG. 2 illustrates an integral, molded arched hood 62 over the holes 38 and 40 and another hood 64 over the hole 42. There are corresponding hoods 66 and 68 (FIG. 4) on the other side of the cover 32. The hoods 62/64/66/68 may extend out about 1-1.5 inches from the surface of the cover 32. The hoods 62/64/66/68 allow the retaining pins 44 and 45 to be fully installed while preventing a raptor wing or squirrel tail from coming within 1-1.5 inches of any of the holes 38/40/42. The width of the cover 32 may be about 4-5 inches, so the hoods 62/64/66/68 add about 20% or more to the effective width of the cover 32 in the area of the holes 38/40/42 with very little added bulk or cost to the cover 32.

In another embodiment, the hoods completely surround the holes.

The discovery of the cause of the raptor electrocution (flashover through a hole), as well as the solution of the hoods, was not obvious, since a conventional solution would be to just make the cover larger.

The invention of the hoods over the holes in dielectric covers may be applied to any dielectric cover for high voltage components (e.g., 12 KVAC and above) where the cover has holes for retaining pins or holes for a hotstick used by lineman for grasping the cover. Such covers include insulator covers and cable covers. The insulator may support the cable, or the insulator may be for a bushing, solid-blade disconnect, lightning arrestor, or other high voltage component.

Figure 7:
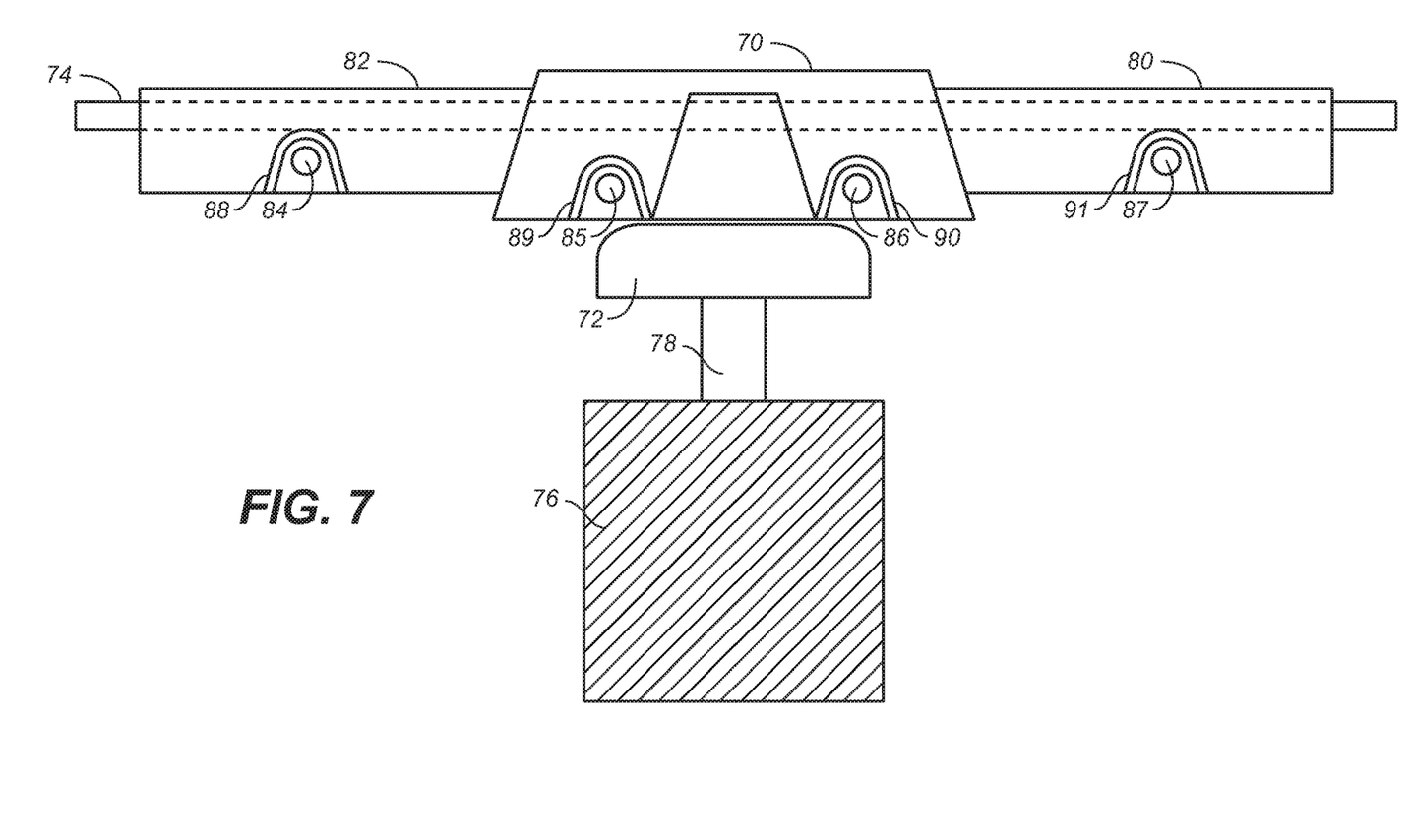
FIG. 7 illustrates how the hood over the holes can be employed in other high voltage component covers, such as an insulator and cable cover to protect wildlife from electrocution.

FIG. 7 illustrates a dielectric cover 70 for an insulator 72 supporting a cable 74. The insulator 72 is attached to a wooden crossarm 76 with a bolt 78. Arms 80 and 82 extend from the cover 70. Retaining pin holes 84, 85, 86, and 87 for the retaining pin 44 of FIG. 6 have associated arched hoods 88-91 that are molded in the cover 70 and arms 80/82. The hoods 88-91 may extend out 1-1.5 inches and prevent a raptor's wings or a squirrel's tail from getting within 1-1.5 inches of the holes 84-87, which are the weak links for flashover.

Figure 8:
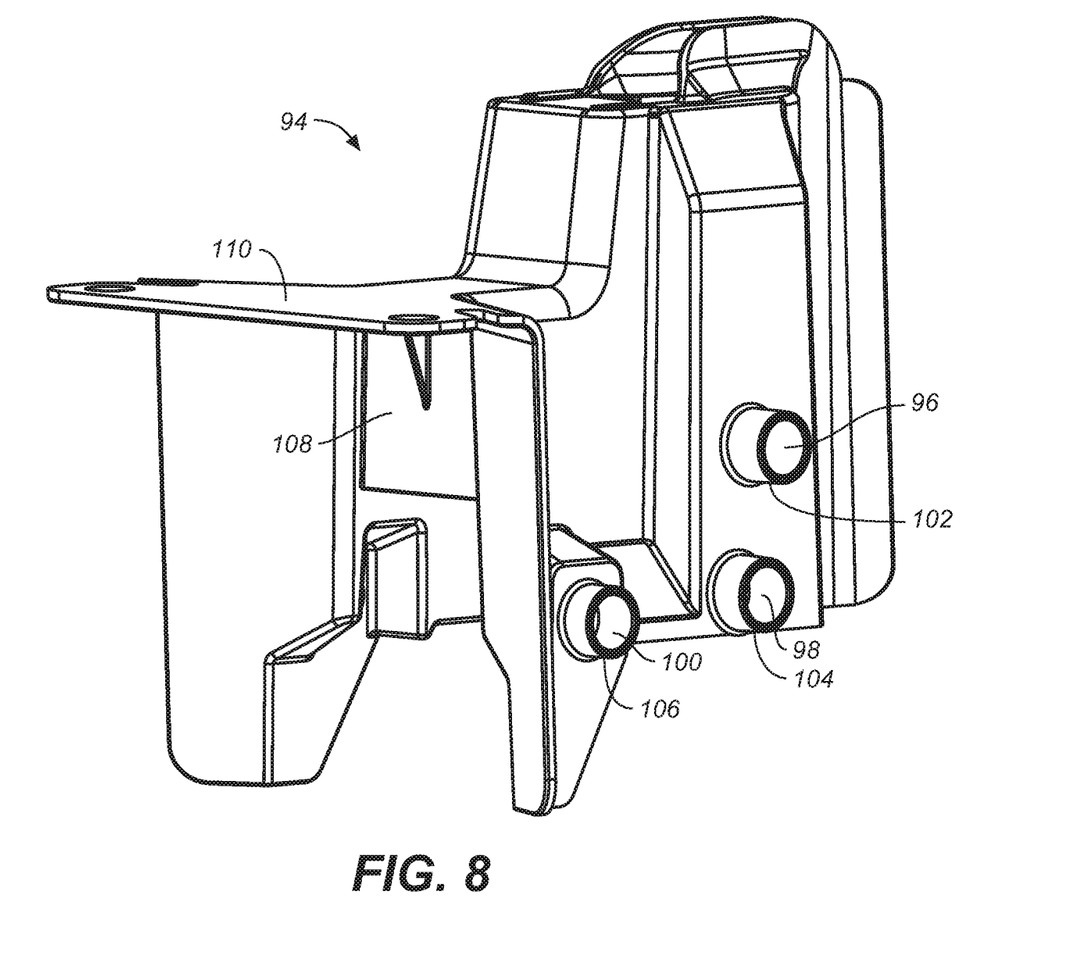
FIG. 8 illustrates how the hood over the holes can be a protruding tube that completely surrounds the holes.

FIG. 8 illustrates how the hood over the retaining pin holes can be a protruding tube that completely surrounds the holes and extends out about 1-1.5 inches from the surface of the cover 94. The general shape of the cover 94 of FIG. 8 is similar to that of FIG. 2 except the holes 96, 98, and 100 for the retaining pins are completely surrounded by molded protruding tubes 102, 104, and 106, respectively.

Additionally, a thin vertical wall 108 spaces the roof 110 of the cover higher above the energized top connector 56 (FIG. 2) of the cutout to increase the vertical clearance when the lineman is positioning the load break tool on the hook assembly 58 (FIG. 2) and the pull ring 30. The additional vertical spacing also provides an added air gap between the roof 110 and the top connector 56 to improve the insulating properties. The wall 108 also blocks birds from nesting in the enlarged front opening.

The tube shaped hoods may be used with the cover 70 of FIG. 7.

The tube shaped hoods or the arch shaped hoods may be used with any other type of high voltage insulator cover or cable cover that has holes for a retaining pin or for a hotstick. The hoods may extend out any amount.

As a secondary effect of the hoods, rain and snow do not directly contact the hole areas, so the hole areas remains dryer. This further improves the flashover prevention function of the hoods.

In another embodiment, a retaining pin does not have to go completely through both of the opposing through-holes, since the pin will still retain the cover in place if it goes through one hole and extends below the cutout component.

Having described the invention in detail, those skilled in the art will appreciate that, given the present disclosure, modifications may be made to the invention without departing from the spirit of the inventive concept described herein.

Therefore, it is not intended that the scope of the invention be limited to the specific embodiments illustrated and described.

What is claimed is:

1. A wildlife protection device for a high voltage power system comprising:
    a dielectric cover configured to at least partially surround at least a portion of a high voltage component, the cover having one or more holes formed through its surface configured for receiving one or more retaining pins extending inside the cover to secure the cover in place over the high voltage component,
    the cover having one or more hoods, extending from the surface of the cover,
    wherein the one or more hoods comprise a tube-shaped molded piece of the cover that protrudes from the surface of the cover and completely surrounds the one or more holes.

2. The device of claim 1 wherein the one or more holes are also configured for being grasped by a hot stick for manipulating the cover.

3. The device of claim 1 wherein the one or more hoods extend greater than one inch from the surface of the cover.

4. The device of claim 1 wherein the one or more holes include a pair of holes on opposite sides of the cover, and wherein the one or more hoods extend out greater than about 20% of a width of the cover between the pair of holes.

5. The device of claim 1 wherein the cover and hoods are an integral molded piece.

6. The device of claim 1 wherein the cover is a fuse cutout cover.

7. The device of claim 1 wherein the cover is an insulator cover.

8. The device of claim 1 wherein the cover covers a portion of an insulator supporting a conductor.

9. The device of claim 1 wherein the cover has an opening in its top surface for a wire.

10. The device of claim 1 wherein the cover has provisions for installing the cover with a hot stick while the high voltage component is energized.

11. The device of claim 1 wherein the cover is installed over the high voltage component and the retaining pins are through the one or more holes to secure the cover in place.

12. The device of claim 1 wherein the one or more holes comprise at least two holes, wherein one of the hoods surrounds the at least two holes.

13. The device of claim 1 wherein the cover is installed over the high voltage component.

* * * * *